United States Patent
Aumann et al.

(10) Patent No.: US 10,829,255 B2
(45) Date of Patent: Nov. 10, 2020

(54) METHOD FOR TRANSFERRING ITEMS TO BE PACKAGED INTO CONTAINERS AND FOR TRANSPORTING THE FILLED CONTAINERS ONWARD

(71) Applicant: Uhlmann Pac-Systeme GmbH & Co. KG, Laupheim (DE)

(72) Inventors: Thomas Aumann, Mietingen (DE); Daniel Zieher, Ummendorf (DE); Wolfgang Rodi, Laupheim/Baustetten (DE); Fritz Fochler, Kammeltal-Behlingen (DE); Mathias Wegerer, Erolzheim-Edelbeuren (DE); Joerg Riekenbrauck, Schwendi (DE); Juergen Haaga, Rottenacker (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 527 days.

(21) Appl. No.: 14/970,099

(22) Filed: Dec. 15, 2015

(65) Prior Publication Data

US 2016/0176560 A1  Jun. 23, 2016

(30) Foreign Application Priority Data

Dec. 19, 2014  (EP) .................................... 14199108

(51) Int. Cl.
  *B65B 35/20* (2006.01)
  *B65B 59/00* (2006.01)
  (Continued)

(52) U.S. Cl.
  CPC .............. *B65B 59/001* (2019.05); *B65B 5/06* (2013.01); *B65B 35/20* (2013.01); *B65B 35/405* (2013.01);
  (Continued)

(58) Field of Classification Search
  USPC .......................................................... 53/473
  See application file for complete search history.

(56) References Cited

U.S. PATENT DOCUMENTS

| | | | |
|---|---|---|---|
| 5,343,671 A | 9/1994 | Tisma | |
| 6,811,024 B2 | 11/2004 | Wieduwilt et al. | |
| (Continued) | | | |

FOREIGN PATENT DOCUMENTS

| | | |
|---|---|---|
| DE | 4100769 A1 | 7/1991 |
| DE | 19860577 A1 | 7/2000 |
| (Continued) | | |

OTHER PUBLICATIONS

European Search Report for EP 14199112 dated Mar. 20, 2015.

*Primary Examiner* — Michelle Lopez
*Assistant Examiner* — Chinyere J Rushing-Tucker
(74) *Attorney, Agent, or Firm* — Dickinson Wright PLLC (57) ABSTRACT

In the method for transferring at least one item to be packaged into a container and for transporting the filled container onward, the container is arranged in a transfer area, which is arranged next to a linear motor transport device. The at least one item to be packaged is conveyed in a conveying direction to a transfer position by the linear motor transport device. After that, the at least one item to be packaged is moved from the transfer position to the transfer area, where the container is filled with the at least one item to be packaged. Then, the filled container is moved from the transfer area to the transport device and is transported onward by the transport device in the conveying direction.

16 Claims, 5 Drawing Sheets

(51) Int. Cl.

| | | |
|---|---|---|
| *B65B 43/48* | (2006.01) | |
| *B65B 65/02* | (2006.01) | |
| *B65B 43/52* | (2006.01) | |
| *B65B 5/06* | (2006.01) | |
| *B65B 65/00* | (2006.01) | |
| *B65B 35/40* | (2006.01) | |
| *B65G 54/02* | (2006.01) | |

(52) U.S. Cl.
CPC .............. *B65B 43/48* (2013.01); *B65B 43/52* (2013.01); *B65B 59/003* (2019.05); *B65B 59/005* (2013.01); *B65B 65/003* (2013.01); *B65B 65/02* (2013.01); *B65G 54/02* (2013.01)

(56) References Cited

U.S. PATENT DOCUMENTS

| | | | |
|---|---|---|---|
| 2002/0148704 A1* | 10/2002 | Jager .................. | B23Q 7/14 198/339.1 |
| 2003/0136086 A1 | 7/2003 | Kalany et al. | |
| 2005/0262802 A1* | 12/2005 | Natterer .................. | B65B 35/24 53/147 |
| 2007/0227101 A1 | 10/2007 | Simm | |
| 2008/0219825 A1* | 9/2008 | Yoshida .................. | B65G 17/20 414/749.6 |
| 2011/0056900 A1* | 3/2011 | Inui .................... | H01L 21/67706 212/98 |
| 2012/0031737 A1* | 2/2012 | Felk ........................ | B65B 43/52 198/604 |
| 2013/0105036 A1* | 5/2013 | Smith .................... | B65B 43/265 141/1 |
| 2013/0326997 A1 | 12/2013 | Rapp et al. | |
| 2014/0083817 A1* | 3/2014 | van de Loecht ..... | B65G 47/841 198/459.8 |
| 2015/0047295 A1* | 2/2015 | van de Loecht ...... | B65B 35/205 53/235 |
| 2015/0158611 A1* | 6/2015 | Kalany .................... | B65B 35/26 53/443 |
| 2015/0321857 A1* | 11/2015 | Sacchetti .............. | B65B 35/405 198/419.2 |

FOREIGN PATENT DOCUMENTS

| | | |
|---|---|---|
| DE | 101233220 A1 | 11/2002 |
| DE | 102005017961 A1 | 10/2006 |
| EP | 1530541 A1 | 5/2005 |
| WO | WO 2013/156177 A1 | 10/2013 |

* cited by examiner

METHOD FOR TRANSFERRING ITEMS TO BE PACKAGED INTO CONTAINERS AND FOR TRANSPORTING THE FILLED CONTAINERS ONWARD

RELATED APPLICATIONS

The present patent document claims the benefit of and priority to European Patent Application No. EP 14199108.3 filed Dec. 19, 2014, the entire contents of which are incorporated herein by reference.

FIELD AND BACKGROUND

The present disclosure relates to a method for transferring items to be packaged, especially blister packs, into containers, especially folding boxes, and for transporting the filled containers onward.

In the pharmaceutical industry, sealed blister packs are often used to store medications. The blister packs contain a plurality of pockets, in which the pharmaceutical products such as pills or tablets are placed. After they have been produced, the blister packs are usually sent during the further course of the packaging process to a packaging station, in which the individual blister packs or stacks of blister packs are introduced into folding boxes.

To introduce the blister packs into the folding boxes, the blister packs are transported along a first route by means of a transport device, whereas the folding boxes are transported along a second route, parallel to the first route, by means of a conveying device comprising appropriately formed holders for the folding boxes. The first and second routes are laid out with respect to each other in such a way that, at least at certain times, the blister packs or stacks of blister packs are arranged next to an open side of their assigned folding boxes. At that point, the blister packs are pushed laterally into their assigned folding boxes. The folding boxes containing the blister packs are then carried onward by the folding box conveying device. During the time that the blister packs are being inserted into the folding boxes, the transport device and the conveying device are either stationary or moving onward, next to each other, at the same speed.

Transport devices are also known in which slides are moved independently of each other along a guide rail. This is realized in that the guide rail comprises a linear motor drive device for driving the slides, wherein each slide comprises at least one permanent magnet, which interacts with the linear motor drive device. A transport device with a linear motor drive of this type is known from, for example, WO 2013/156177 A1.

SUMMARY

It is an object of the present disclosure to propose a method for transferring items to be packaged into containers and for transporting the filled containers onward, which method is especially space-saving and cost-saving.

According to an aspect of the disclosure, the method for transferring items to be packaged, especially blister packs, into containers, especially folding boxes, and for transporting the filled containers onward comprises the following steps:

providing a transport device with at least one slide; with a guide rail, along which the at least one slide can be moved; and with a linear motor drive device for driving the at least one slide, wherein the at least one slide comprises at least one permanent magnet, which interacts with the guide rail;

arranging at least one container intended to accept at least one item to be packaged in at least one transfer area, which is arranged next to the transport device;

conveying the at least one item to be packaged in a conveying direction to at least one transfer position by means of the transport device;

moving the at least one item to be packaged from the at least one transfer position into the at least one transfer area;

filling the at least one container in the at least one transfer area with the at least one item to be packaged;

moving the at least one filled container from the at least one transfer area to the transport device; and transporting the at least one filled container onward by means of the transport device in the conveying direction.

In this method, the initial transportation of the items to be packaged and the further transportation of the containers filled with the items is carried out with one and the same transport device. It is thus possible to omit a separate conveying device for transporting the filled containers onward. In addition to the reduced amount of space required, the elimination of the separate conveying device also lowers costs.

The at least one item to be packaged and the filled container are preferably each transported in at least one product holding space assigned to a slide.

When it is transporting the at least one item to be packaged, the product holding space preferably comprises a first length, and when it is transporting the filled container, it comprises a second length, which is greater than the first length. Because the at least one item to be packaged and the filled container are transported in the product holding space, which changes according to the size of the object to be transported, the objects can be arranged and carried along stably and not loosely on the slides. As a result, objects of different sizes and shapes can be transported reliably by means of the same transport device.

If the at least one product holding space is formed by two retaining elements, wherein one retaining element functions as a pusher and the other as a stop, and wherein the pusher pushes the item to be packaged or the filled container against the stop to hold it, the holding and release of the at least one item to be packaged or of the filled container can be accomplished in an especially rapid and reliable manner simply by moving one of the two retaining elements relative to the other.

It may be especially advantageous for the two retaining elements to be shifted relative to each other by means of the interaction of at least one permanent magnet with the linear motor drive device. Therefore, the movement of the retaining elements for changing the product holding space can be efficiently controlled electronically. There is no need to make any manual adjustment to the distance between the retaining elements.

In one embodiment, the transport device comprises at least one first and one second slide, on each of which one of the retaining elements is arranged. As a result, the slides and thus also the retaining elements arranged on the slides can be moved independently of each other along the guide rail. The advantage of this configuration consists in particular in that both the transport in the conveying direction and the adjustment of the length of the product holding space are achieved simply by moving the slides.

In an advantageous elaboration, the first slide, when in the transfer position, is moved in the conveying direction, whereas the second slide is moved in a direction opposite to the conveying direction for the purpose of increasing the distance between the retaining elements and thus of increasing the length of the at least one product holding space. The distance is therefore changed symmetrically, so that the relative position of the product holding space to the transfer area remains unchanged. There is therefore no need for any further compensating movement of the transport device when the filled container is to be introduced into the product holding space.

After the filled container has been moved back to the transport device, the first and second slides are preferably moved toward each other, so that the retaining elements can hold the filled container between them. It is possible for only the first slide to be moved toward the second slide, whereas the second slide is not moved, or vice versa. It is also possible for both slides to be moved toward each other simultaneously.

It may be advantageous for the at least one item to be packaged to be moved from the transport device to the transfer area by pushing the at least one item in a first direction transverse to the conveying direction. In the same way, the at least one container is filled with the at least one item to be packaged by pushing the at least one item into the at least one container in a first direction transverse to the conveying direction. Finally, the movement of the at least one filled container from the transfer area to the transport device is accomplished also by pushing the at least one filled container, but here it is pushed in a second direction, opposite the first direction. The transfer of the at least one item to be packaged, the introduction of the at least one item into the at least one container, and the movement of the filled container by pushing result in a stable and rapid overall process.

The at least one container intended to accept the at least one item to be packaged can be conveyed by a second transport device to the least one transfer area.

The at least one container intended to accept the at least one item to be packaged can also be conveyed initially by the transport device in the conveying direction to the at least one transfer position and then moved to the transfer area, in particular by pushing. In this embodiment, both the at least one item to be packaged and the at least one container are initially transported by means of the transport device. Because, after the filling step, the at least one filled container is also transported onward by means of the transport device, only one transport device is needed. This saves space and reduces costs.

Alternatively, a method for filling containers, especially folding boxes, with items to be packaged, especially blister packs, and for transporting the filled containers onward can comprise the following steps:
 providing a transport device with at least one slide; with a guide rail, along which the at least one slide can be moved; and with a linear motor drive device for driving the at least one slide, wherein the at least one slide comprises at least one permanent magnet, which interacts with the linear motor drive device;
 arranging at least one container intended to accept the at least one item to be packaged in at least one transfer area, which is arranged next to the transport device;
 conveying the at least one item to be packaged in a conveying direction to the at least one transfer position by means of the transport device;
 moving the at least one container from the at least one transfer area into the at least one transfer position, thereby filling the at least one container with the at least one item to be packaged; and
 transporting the at least one filled container onward by means of the transport device in the conveying direction.

In this alternative method, the initial transport of the items to be packaged and the transport of the filled containers onward are again carried out with one and the same transport device. Thus it is possible to omit a separate conveying device for transporting the filled containers onward. In addition to the reduced amount of space required, the elimination of the separate conveying device also has the effect of lowering costs.

The at least one item to be packaged and the filled container are each preferably transported in a product holding space assigned to the at least one slide.

When transporting the at least one item to be packaged, the product holding space preferably comprises a first length, and when transporting the at least one filled container, it comprises a second length, which is greater than the first length. Because the at least one item to be packaged and the filled container are transported in the product holding space, which is changed according to the size of the object to be transported, the objects can be arranged and carried along stably and not loosely on the at least one slide. As a result, different objects can be transported reliably by the same transport device.

If the at least one product holding space is formed by two retaining elements, wherein one retaining element functions as a pusher, the other as a stop, and wherein the pusher pushes the at least one item to be packaged or the filled container against the stop element to hold it, the holding and release of the at least one item to be packaged or of the filled container can be carried out in an especially rapid and reliable manner simply by moving one of the two retaining elements relative to the other.

It may be especially advantageous for the two retaining elements to be pushed relative to each other by the interaction between at least one permanent magnet and the linear motor drive device. Thus the movement of the retaining elements for the purpose of changing the product holding space can be efficiently controlled electronically. There is no need for manual adjustments to the distance between the retaining elements.

In another embodiment, the transport device comprises at least one first and one second slide, on each of which one of the retaining elements is arranged. As a result, the slides and thus also the retaining elements assigned to the slides can be moved independently of each other along the guide rail. The advantage of this embodiment consists in particular in that both the transport in the conveying direction and the adjustment of the length of the product holding space are accomplished simply by moving the slides.

In an advantageous elaboration, the first slide, when in the transfer position, is moved in the conveying direction, whereas the second slide is moved in a direction opposite to the conveying direction to increase the distance between the retaining elements and thus the length of the at least one product holding space. The change in distance is therefore is achieved symmetrically, so that the relative position of the product holding space to the transfer area remains unchanged. There is therefore no need for any additional compensating movement of the transport device when the empty container is to be introduced into the product holding space.

After the empty container has been moved to the transport device and the at least one item to be packaged thereby inserted, the first and second slides are preferably moved toward each other, so that the retaining elements can hold the at least one container, now filled, between them. It is possible for only the first slide to be moved toward the second slide, while the second slide remains unmoved, or vice versa. It is also possible for both slides to be moved toward each other simultaneously.

It may be advantageous for the at least one empty container to be moved from the transfer area to the transport device by pushing the at least one empty container in a direction which is perpendicular to the conveying direction of the transport device. Because the empty container is moved by pushing, a stable and rapid overall process is obtained.

The at least one container intended to accept the at least one item to be packaged can be conveyed by a second transport device to the at least one transfer area.

The at least one container intended to accept the at least one item to be packaged can also be conveyed initially by the transport device in the conveying direction to the at least one transfer position and then moved to the transfer area, in particular by pushing. In this embodiment, both the items to be packaged and the containers are initially transported by the transport device. Because, after the filling, the filled containers are also transported onward by means of the transport device, only one transport device is required. This saves spaces and lowers costs.

DETAILED DESCRIPTION OF SPECIFIC EMBODIMENTS

The method according to the present disclosure for transferring items to be packaged into containers and for transporting the filled containers onward is described in greater detail below on the basis of the drawings. In the corresponding figures, the items to be packaged 2 are shown in the form of blister packs or stacks of blister packs. In addition, the containers 4 are shown in the form of folding boxes. Usually, a stack of blister packs is inserted into each folding box. It is obvious, however, that the items to be packaged 2 and the containers 4 are not limited to these concrete realizations.

Figure 1:
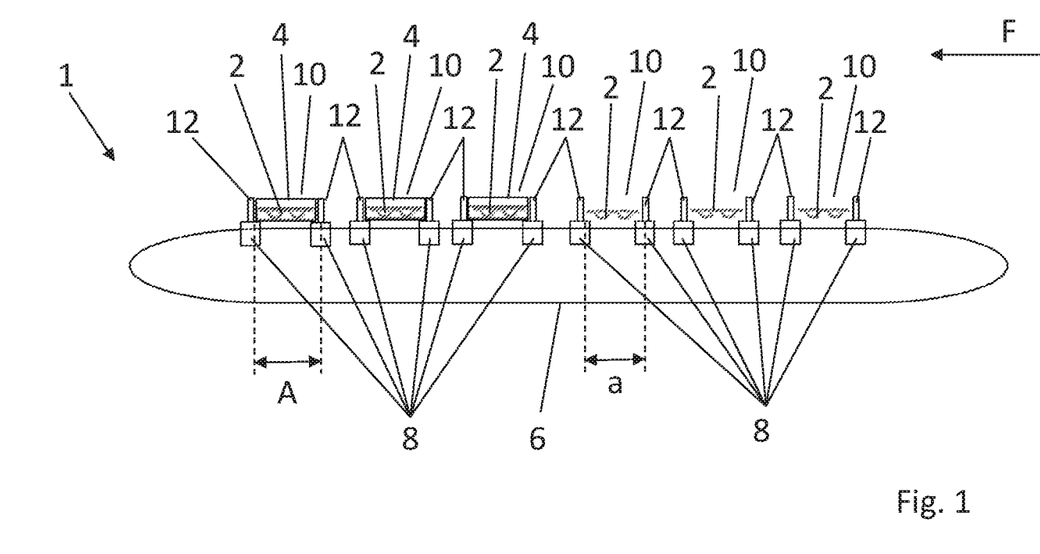
FIG. 1 shows a schematic side view of a transport device which can be used in the method according to the present disclosure.
Figure 2:
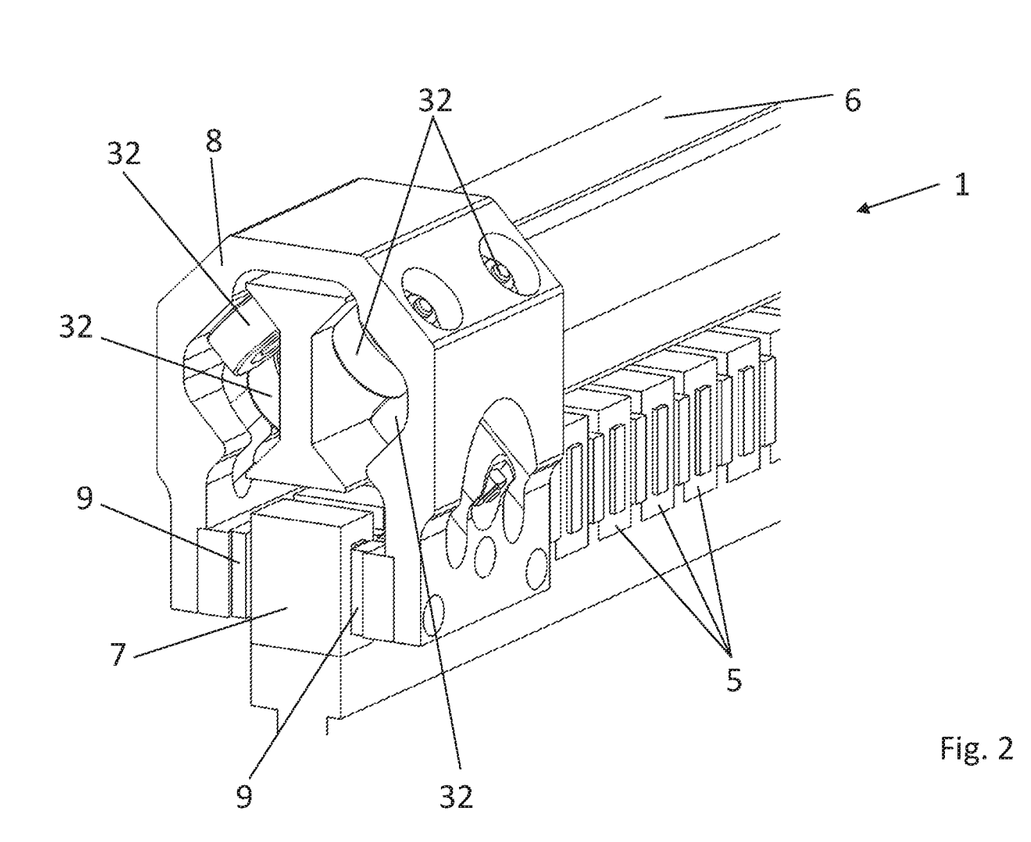
FIG. 2 show a perspective view of a section of the transport device of FIG. 1, which illustrates the general layout of the transport device.

FIG. 1 shows a side view of the layout of a transport device 1, which can be used to implement the method according to the invention. FIG. 2 shows the basic layout of the transport device 1. The transport device 1 comprises a stationary, in particular endless, guide rail 8 for guiding at least one movable slide 8, preferably several slides 8 capable of moving independently of each other. Although twelve slides 8 are shown in the example of FIG. 1, fewer or more than twelve slides 8 can be arranged simultaneously on the guide rail 6.

A linear motor drive device 7, which comprises a plurality of coils 5 arranged in a row, each of which can be supplied individually with current, serves to drive the slides 8. Each slide 8 in turn comprises at least one, preferably two, permanent magnets 9, which interact with the linear motor drive device 7. Thus each slide 8 can be put into motion individually along the guide rail 6. As FIG. 2 shows, the slides 8 are supported and guided along the guide rail 6 by a plurality of rollers 32. The slides 8 and the means for their support on the guide rail 6 can be configured in many different ways.

The conveying direction F of the items to be packaged 2 in the transport device 1 is preferably straight, as indicated in FIG. 1 by the arrow. The conveying direction F of the items to be packaged 2 can also be variable, however; that is, it can also include curves. The conveying direction F can also be opposite to the conveying direction shown in FIG. 1.

In the example of FIG. 1, the endless guide rail 6 has the form of an elongated, horizontal oval. The slides 8 move all the way around the guide rail 6 until they reach their starting point again. The longer, straight upper section of the guide rail 6 extends in the conveying direction F and forms the part of the transport device 1 in which the items to be packaged 2 and/or the containers 4 are conveyed.

The slides 8 in FIG. 1 are arranged one behind the other in the conveying direction F on the upper section of the guide rail 6 and are formed into a total of six pairs of slides 8. To each pair of slides 8, a product holding space 10 is assigned, in which the at least one item to be packaged 2 or a container 4 filled with the at least one item to be packaged 2 can be transported. Each product holding space 10 is usually limited by retaining elements 12, i.e., a retaining element in the front with respect to the conveying direction F and a retaining element in the rear with respect to the conveying direction F.

In the embodiment shown here, each slide 8 comprises precisely one retaining element 12, so that a product holding space 10 is created in each case between the two retaining elements 12 of the two slides 8 of a pair.

As the at least one item to be packaged 2 or the container 4 is being transported, the two slides 8 of the pair are moved identically, so that the at least one item to be packaged 2 or the filled container 4 is held in the product holding space 10, where the retaining elements 12 preferably exert a small amount force on the at least one item or on the container.

The three pairs of slides 8 on the right in FIG. 1 are each transporting an item to be packaged 2, whereas the three pairs of slides on the left in FIG. 1 are each transporting a container 4 filled with an item 2. When transporting at least one item to be packaged 2, the product holding space 10 usually has a first length a, and when transporting a filled container 4, it has a second length A, which is greater than the first length a, because the dimensions of the containers 4 are larger than those of the items to be packaged 2. In the embodiment of FIG. 1, this means that, as they are moving along the rail, the slides 8 of the three pairs of slides 8 on the right are closer together than the slides 8 of the three pairs of slides on the left.

The intermediate steps involved in filling the containers with the items to be packaged 2 are explained in greater detail below with reference to FIGS. 4A-4C.

In the following, the individual phases of an example of the method according to the present disclosure and of the embodiments are explained in greater detail on the basis of FIGS. 3-5.

Each of FIGS. 3A-3D shows a schematic view from above of a transport device 1 with a guide rail 6 and a product holding space 10. The diagrams thus illustrate the four phases of a simple exemplary embodiment of the method according to the invention. In FIGS. 3A-3D, furthermore, a transfer area 14 is also shown, which is arranged next to a transfer position 15 of the transport device 1.

Figure 3A:
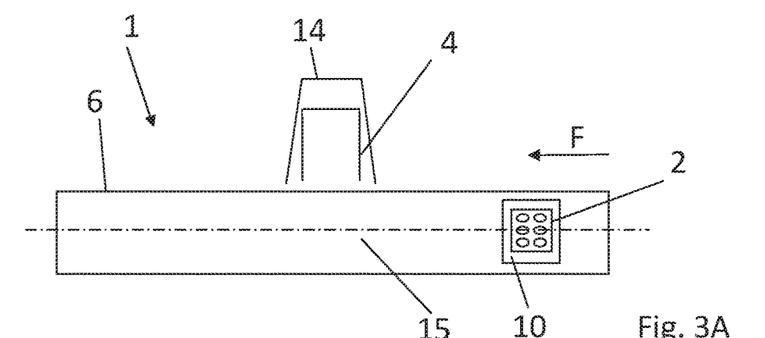
FIGS. 3A-D show schematic views from above, in which four phases of a first exemplary embodiment of the method according to the present disclosure are illustrated.

In the first phase, shown in FIG. 3A, a container 4 has already been arranged in the transfer area 14 to accept at least one item to be packaged 2, wherein the open side of the container 4 is facing the guide rail 6 of the transport device 1. A product holding space 10 of the transport device 1 is loaded with at least one item to be packaged 2 and is being moved in the conveying direction F.

Figure 3B:
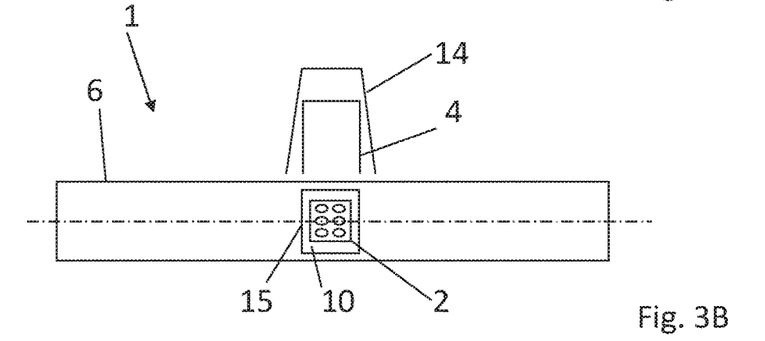

In the second phase, shown in FIG. 3B, which proceeds from the diagram of FIG. 3A, the product holding space 10 with the at least one item to be packaged 2 is moved into a transfer position 15 next to the transfer area 14. The product holding space 10 arranged in the transfer position 15 is positioned next to the container 4 in the direction transverse to the conveying direction F.

Figure 3C:
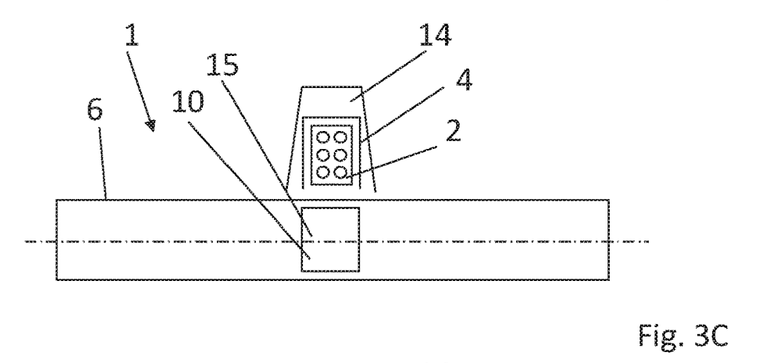

In FIG. 3C, which proceeds from FIG. 3B, the at least one item to be packaged 2 is moved from the slide 8 into the transfer area 14, in which the container 4 is located. The container 4 has thus been filled with the at least one item to be packaged 2.

Figure 3D:
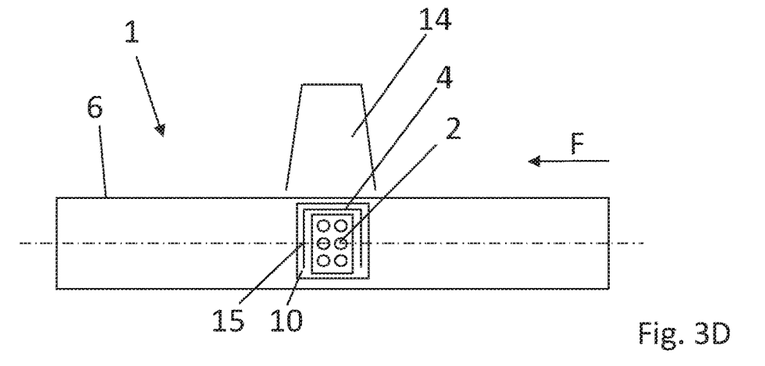

In FIG. 3D, which proceeds from FIG. 3C, the container 4 filled with the at least one item to be packaged 2 has been moved from the transfer area 14 back to the transport device 1 and arranged in the product holding space 10. For this purpose, the size of the product holding space 10 has preferably been increased slightly. The product holding space 10 with the filled container 4 can now be transported onward in the conveying direction F.

Figure 4A:
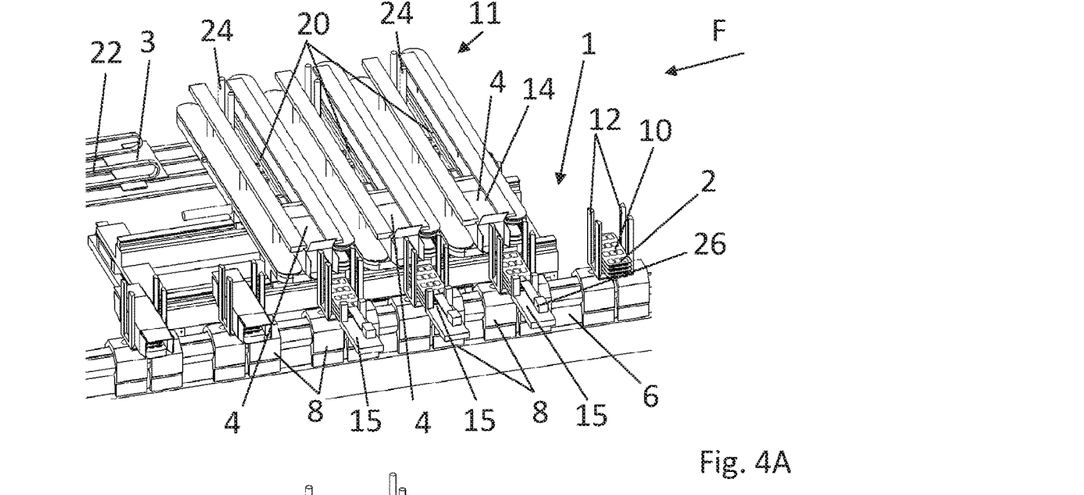
FIGS. 4A-C show perspective views, in which three phases of an additional exemplary embodiment of the method according to the present disclosure are illustrated schematically.
Figure 4B:
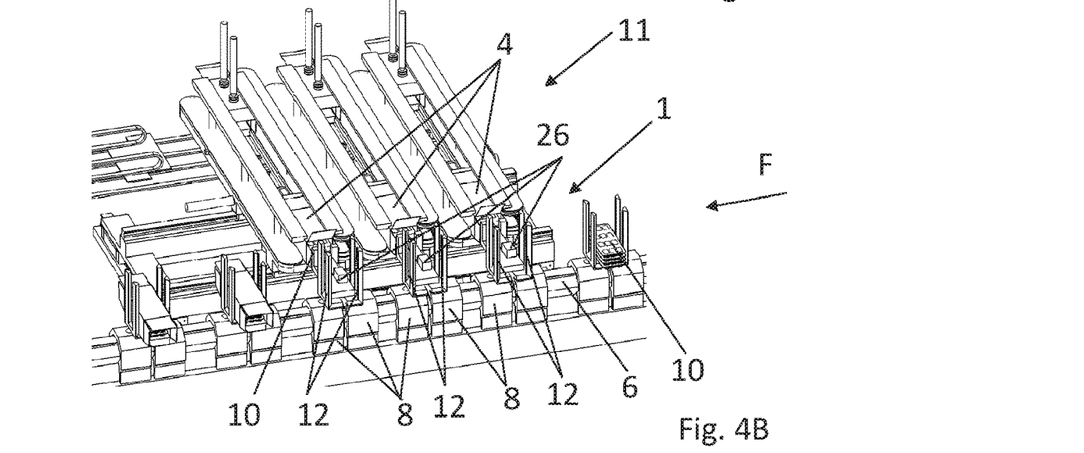
Figure 4C:
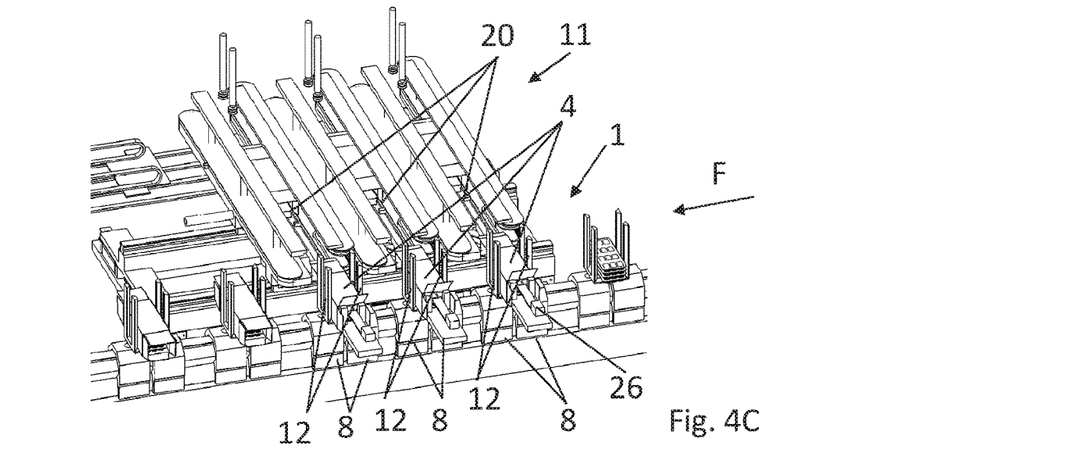

Each of FIGS. 4A-4C shows a perspective view of a section of a transport device 1 corresponding to the transport device 1 of FIG. 1 and of a feed device 11 for the initial transport of the containers 4. The diagrams illustrate the three phases of another exemplary embodiment of the method according to the invention.

As can be seen in FIGS. 4A-4C, three transfer areas 14 are arranged in a row in the conveying direction F. A feed device 11 serves to supply containers 4 to the individual transfer areas 14.

The feed device 11 in the example shown here comprises a feed mechanism 22 for feeding flat folding box blanks 3 in a direction parallel to the conveying direction F. These folding box blanks 3 are then opened up in the three lines of the feed device 11 by means of an opening device 24 in each line, and then, in the opened state as containers 4, they are moved by a linear transport section 20 extending transversely to the conveying direction F to the individual transfer areas 14. As the feed mechanism 22 for feeding the flat folding box blanks 3, a suction belt, for example, can be used. Vertically movable suction grippers, for example, can be used as opening mechanisms 24. The linear transport devices 20 can be formed, for example, by pairs of oppositely driven belts, which hold the opened folding box blanks (containers 4) between them. In addition to this concrete configuration, the person skilled in the art will be able to imagine many other possible configurations and relative arrangements of the various elements of the feed device 11.

In the first phase of the method, shown in FIG. 4A, the feed device 11 has already arranged opened-up containers 4 in the transfer areas 14. In addition, a product holding space 10 filled with a stack of items to be packaged 2 has been arranged in the transfer position 15. For this purpose, the product holding space 10 was filled by a conventional filling device (not shown), and the slides 8 were pushed in the conveying direction F until they reached the transfer positions 15.

In FIG. 4B, the items to be packaged 2 have been pushed from the product holding space 10 by pushers 26, preferably sliding plates, in a first direction transverse to the conveying direction F to the transfer areas 14 and thus pushed into the containers 4. In addition, the retaining elements 12 of the emptied slides 8 are then preferably moved apart by movement in opposite directions to increase the size of the product holding space 10, so that there is enough room created to hold the filled containers 4.

FIG. 4C shows a third phase, which proceeds from the diagram in FIG. 4B, and in which the filled containers 4 are pushed from the transfer areas 14 in a second direction opposite to the first direction back into the product holding spaces 10. The pushing action in the exemplary embodiment shown is preferably effected by the linear transport sections 20, wherein, during the pushing step, the pushers 26 preferably serve as steadies for the filled containers 4. By the end, the pushers 26 are back in the starting positions shown in FIG. 4A.

In another phase (not shown) of the first embodiment of the method according to the invention, it is now possible, following the phase shown in the diagram in FIG. 4C, for the slides 8 loaded with filled containers 4 to be moved onward in the conveying direction F, whereupon slides 8 loaded with items to be packaged 2 can be moved up from behind into the transfer positions 15 of the transport device 1. Thus one cycle of the method has been completed, and the previously described steps are now repeated as often as desired.

Each of FIGS. 5A-5D is a schematic view from above of a transport device 1 with a guide rail 6 and several product holding spaces 10. These views schematically illustrate four phases of another simple exemplary embodiment of the method according to the invention. FIGS. 5A-5D also show a transfer area 14, which is arranged next to a transfer position 15 of the transport device 1.

In contrast to the embodiments of FIGS. 3A-3D and FIGS. 4A-4C, in which the containers 4 are supplied by a separate feed device 11 to the transfer areas 14, in the embodiment shown in FIGS. 5A-5D, the transport device 1 is also used to supply the empty containers 4 to be filled. In other words, both the items to be packaged 2 and the containers 4 are initially transported by the transport device 1.

Figure 5A:
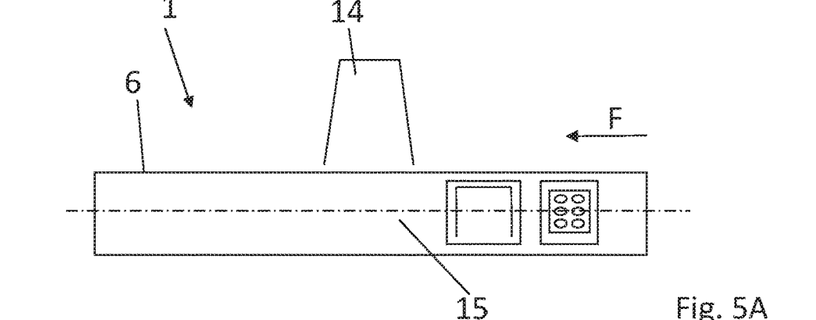
FIGS. 5A-D show schematic views from above, in which four phases of another exemplary embodiment of the method according to the present disclosure are illustrated.

FIG. 5A shows a first phase of this exemplary embodiment of the method according to the invention. In FIG. 5A, a first product holding space 10 loaded with an empty container 4 and a product holding space 10 loaded with at least one item to be packaged 2 are shown in the right section of the transport device 1. The two holding spaces 10 are moved along one behind the other.

Figure 5B:
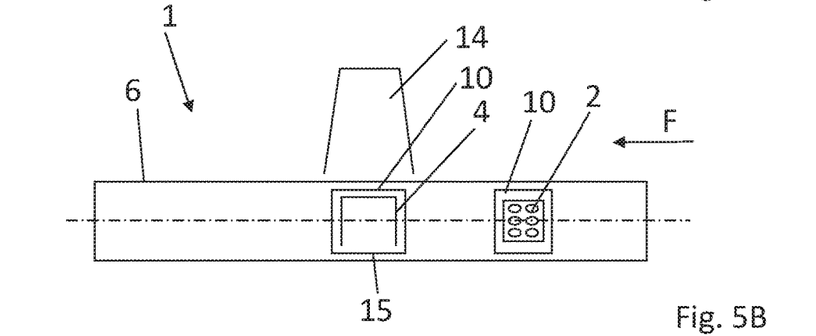

FIG. 5B shows a second phase of the exemplary embodiment, which proceeds from the diagram of FIG. 5A. The first product holding space 10 loaded with the container 4 and the second product holding space 10 loaded with the at least one item to be packaged 2 are moved onward in the conveying direction F. As can be seen, the first product holding space 10 with the empty container 4 is now located in the transfer position 15 next to the transfer area 14.

Figure 5C:
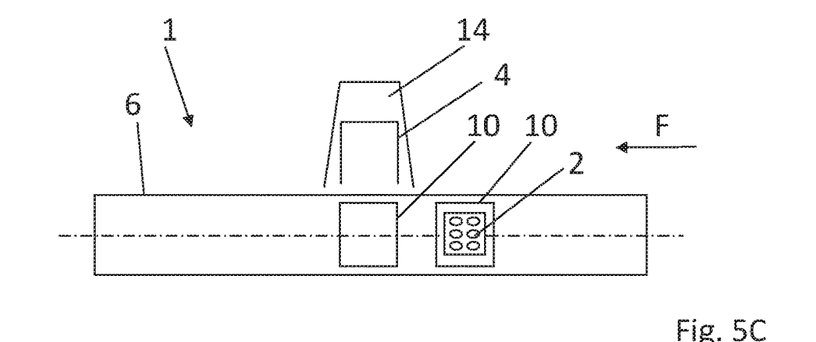

In FIG. 5C, which proceeds from the diagram of FIG. 5B, the empty container 4 has been moved from the product holding space 10 to the transfer area 14. The open side of the container 4 is facing the transport device 1.

Figure 5D:
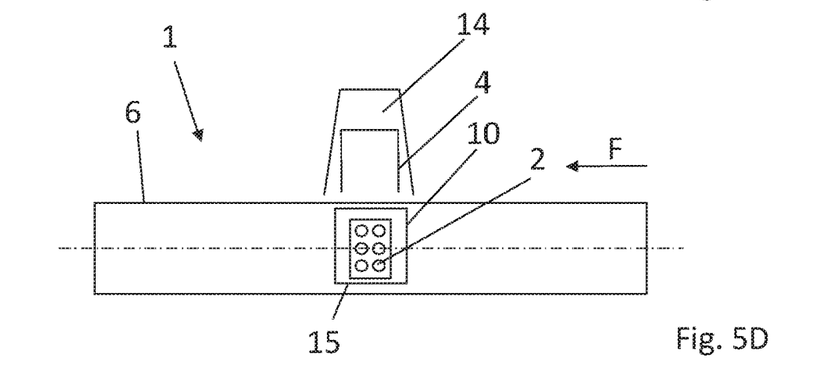

In the fourth phase shown in FIG. 5D, the empty first product holding space 10 (no longer visible) has been moved onward in the conveying direction F, and the second product holding space 10 loaded with the at least one item to be packaged 2 has been moved up from behind in the conveying direction F into the transfer position 15.

In the following phases of this exemplary embodiment, the container 4 arranged in the transfer area 14 is filled with the at least one item to be packaged 2, which has been transported into position in the second product holding space 10. Then the filled container 4 is pushed back again into this or another product holding space 10 coming up from behind and transported onward by the transport device. These method steps are identical to those described on the basis of FIGS. 3C and 3D. There is therefore no need to describe them again.

As an alternative to the embodiments described so far, it is also possible that the at least one item to be packaged 2 is not moved from the at least one transfer position 15 in the at least one transfer area 14 but rather that the at least one empty container is moved from the at least one transfer area 14 into the at least one transfer position 15 and thereby filled with the at least one item to be packaged 2. For this purpose, suitable pushers and guides for the at least one container 4 are required. In particular, it is advantageous for the at least one container 4 to be configured as a folding box and for it to be pushed over the at least one item to be packaged 2 in the form of a blister pack or a stack of blister packs.

In the embodiments described above, a retaining element 12 is assigned to each slide 8. The at least one item to be packaged 2 or the container 4 is held between the retaining elements 12 of a pair of slides 8 as it is being transported. In principle, when both sides of the retaining elements 12 of certain slides 8 are used, n slides 8 arranged in a row can define n−1 product holding spaces. In another embodiment, not shown in the figures, at least two retaining elements can be assigned to each slide 8. In this case each slide 8 constitutes by itself at least one product holding space 10 and/or can cooperate with other slides 8 to form product holding spaces 10.

The retaining elements 12 comprise in each case a vertical dimension. They can, for example, have the shape of an "I". In this case, the at least one item to be packaged 2 or the container 4 preferably rests on support surfaces on the slides 8, and only their sides are supported by the retaining elements 12. The retaining elements 12 can also be configured in the shape of an "L" or an inverted "T", wherein the legs of the L-shape or T-shape then also serve as support surfaces of the product holding space 10. Finally, the retaining elements 12 can also comprise inner support surfaces comprising curved sections. Only one side of a retaining element 12 can be used to hold an object, or both sides can be used. To this extent, a retaining element 12 can also be used to form two product holding spaces 10.

Many individual aspects of the basic scheme according to the present disclosure described so far can be modified as desired. For example, in all of the embodiments, several product holding spaces 10 can be filled simultaneously, emptied simultaneously, and/or transported simultaneously. Accordingly, several transfer positions 15 and transfer areas 14 can also be present. Especially in the embodiments described on the basis of FIGS. 3 and 5, this can be useful as a way of increasing throughput. The number of product holding spaces 10 and of slides 8 is variable in principle and is to be adapted to the concrete application.

In addition to the pushing movement described so far, the items to be packaged 2 and the containers 4 could also be lifted to the transfer area 14 and back again by the transport device 1 or moved in some other way. The pushing movement, however, has the advantage of simplicity of realization. In addition, package inserts (not shown), which are transported into position in the known manner, can also be introduced together with the item to be packaged 2 into the container by these pushing movements.

The length of the product holding spaces 10 in the conveying direction F, that is, the distance between the pairs of retaining elements 12, is basically adjustable to suit the individual application. Different products require product holding spaces 10 of different lengths. In addition, the product holding spaces 10 for containers 4 are usually to be made somewhat longer than the product holding spaces 10 for the items to be packaged 2. Finally, it can also be useful, as a way of facilitating the insertion of the items to be packaged 2 or of the containers 4 into product holding spaces 10, to make these product holding spaces 10 somewhat longer initially, and then, after the items to be packaged 2 or the containers 4 have been inserted, to return the holding spaces to their original length. The movement of the retaining elements 12 relative to each other is usually accomplished by the efficient actuation of the slides 8 by means of the linear motor drive device 7.

In this way, a highly flexible system is created, which covers all possible areas of application without the need to exchange format-dependent parts.

The invention claimed is:

1. A method for transferring at least one item to be packaged into at least one container and for transporting the at least one filled containers onward, comprising the steps of:

providing an endless transport device comprising at least one slide, a guide rail, along which the at least one slide is moved, and a linear motor drive device for driving the at least one slide, wherein the at least one slide comprises at least one permanent magnet, which interacts with the linear motor drive device;

arranging the at least one container intended to receive at least one item to be packaged in at least one transfer area, which is arranged next to the endless transport device;

conveying the at least one item to be packaged in a conveying direction to at least one transfer position on the endless transport device by means of the at least one slide of the endless transport device;

moving the at least one item to be packaged from the at least one transfer position to the at least one transfer area;

filling the at least one container in the at least one transfer area with the at least one item to be packaged;

moving the at least one filled container from the at least one transfer area back to the same at least one slide of the endless transport device which has been used for conveying the at least one item to be packaged in the conveying direction to the at least one transfer position and which has been waiting in the at least one transfer position; and transporting the at least one filled container onward in the conveying direction by means of the same at least one slide of the endless transport device which has been used for conveying the at least one item to be packaged in the conveying direction to the at least one transfer position.

2. The method according to claim 1, wherein the at least one item to be packaged and the at least one filled container are each transported in at least one product holding space assigned to the at least one slide.

3. The method according to claim 2, wherein, when transporting the at least one item to be packaged, the at least one product holding space has a first length, and, when transporting the at least one filled container, the at least one product holding space has a second length, which is greater than the first length.

4. The method according to claim 2, wherein the at least one product holding space is formed between two retaining elements.

5. The method according to claim 4, wherein the two retaining elements are moved relative to each other by an interaction of at least one permanent magnet with the linear motor drive device.

6. The method according to claim 5, wherein the transport device comprises a first and a second slide, on each of which one of the retaining elements is arranged.

7. The method according to claim 6, wherein, when in the at least one transfer position, the first slide is moved in the conveying direction, while the second slide is moved in a direction opposite to the conveying direction, in order to increase a distance between the retaining elements and thus increase a size of the at least one product holding space.

8. The method according to claim 7, wherein, after the at least one filled container has been moved to the transport device, the first and second slides are moved toward each other so that the at least one filled container is held between the retaining elements.

9. The method according to claim 1, wherein moving of the at least one item to be packaged from the transport device to the at least one transfer area is accomplished by pushing the at least one item to be packaged in a first direction transverse to the conveying direction.

10. The method according to claim 9, wherein moving of the at least one filled container from the at least one transfer area to the transport device is accomplished by pushing the at least one filled container in a second direction opposite to the first direction.

11. The method according to claim 1, wherein filling of the at least one container with the at least one item to be packaged is accomplished by inserting the at least one item to be packaged into the at least one container in a first direction transverse to the conveying direction.

12. The method according to claim 1, wherein the at least one container intended to receive the at least one item to be packaged is conveyed by a feed device to the at least one transfer area.

13. The method according to claim 1, wherein the at least one container intended to receive the item to be packaged is first conveyed by the transport device in the conveying direction to the at least one transfer position, whereupon the at least one container is moved to the at least one transfer area.

14. The method according to claim 13, wherein the at least one container is moved to the at least one transfer area by pushing.

15. A method for filling at least one container with at least one item to be packaged and for transporting the at least one filled container onward, comprising the steps of:
provi­ding an endless transport device comprising at least one slide, a guide rail, along which the at least one slide is moved, and a linear motor drive device for driving the at least one slide, wherein the at least one slide comprises at least one permanent magnet, which interacts with the linear motor drive device;
arranging the at least one empty container intended to receive the at least one item to be packaged in at least one transfer area, which is arranged next to the transport device;
conveying the at least one item to be packaged in a conveying direction to at least one transfer position by means of the at least one slide of the endless transport device;
filling the at least one empty container with the at least one item to be packaged by moving the at least one empty container from the at least one transfer area into the at least one transfer position; and
transporting the at least one filled container onward by means of the at least one slide of the endless transport device in the conveying direction.

16. The method according to claim 15, wherein the at least one item to be packaged and the at least one filled container are each transported in at least one product holding space assigned to the at least one slide, wherein the at least one product holding space, when transporting the at least one item to be packaged, has a first length and, when transporting the at least one filled container, has a second length, which is greater than the first length.

* * * * *